(12) United States Patent
Router

(10) Patent No.: US 7,535,904 B1
(45) Date of Patent: May 19, 2009

(54) ROUTING OF STREAMING MEDIA

(75) Inventor: Christian Router, Blanchardstown (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/244,912

(22) Filed: Oct. 3, 2008

(51) Int. Cl.
*H04L 12/56* (2006.01)
*H04J 1/16* (2006.01)

(52) U.S. Cl. .................. 370/390; 370/432; 709/238

(58) Field of Classification Search ........... 370/390, 370/392, 432, 351; 709/238–242
See application file for complete search history.

(56) References Cited

U.S. PATENT DOCUMENTS

| | | |
|---|---|---|
| 6,795,403 B1 | 9/2004 | Gundavelli |
| 6,970,943 B1 | 11/2005 | Subramanian |
| 2007/0005804 A1* | 1/2007 | Rideout .................. 709/246 |
| 2007/0033609 A1 | 2/2007 | Dei |
| 2007/0058629 A1 | 3/2007 | Luft |

* cited by examiner

*Primary Examiner*—John Pezzlo
(74) *Attorney, Agent, or Firm*—Dillon & Yudell LLP

(57) ABSTRACT

A method of sending streaming media over a network receives a packet at a router and determines if the packet is addressed to multiple addressees. If the packet is addressed to a single addressee, the method inspects Layer 7 content of the packet. If the packet is a stream and if a packet having identical Layer 7 content is in a queue for a same next router, the method adds the addressee of the packet to the packet having identical Layer 7 content in the queue for the same next router and drops the packet. If the packet is addressed to multiple addressees via a same next router, the method inspects Layer 7 content of the packet. If the packet is a stream and if a packet having identical Layer 7 content is a queue for the same next router, the method adds the addressees of the packet to the packet having identical Layer 7 content in the queue for the same next router and drops the packet. If the packet is addressed to multiple addressees via multiple next routers, the method puts the packet in respective queues for each of the multiple routers.

1 Claim, 2 Drawing Sheets

ROUTING OF STREAMING MEDIA

BACKGROUND OF THE INVENTION

1. Technical Field

The present invention relates in general to the field of streaming media, and more particularly to an improved method of and system for routing streaming media that minimizes network bandwidth requirements between routers.

2. Description of the Related Art

Streaming media has become a popular means of providing content over the Internet. Examples of streaming media include Internet radio and television. Internet radio is similar to broadcast radio in that it is provided in real time to whomever may be listening. Internet radio differs from broadcast radio in how it is transmitted to listeners. In broadcast radio, a signal is transmitted "over the air" and listeners may access the broadcast signal by tuning their radio receivers to the frequency of the transmitter. In Internet radio, a media server packetizes the content stream and transmits the packets addressed to clients that have requested the content. Since Internet radio is provided in real time, the server or servers transmit each packet to each requesting client at substantially the same time. The clients assemble the packets into the content stream to which their respective users may listen.

The Internet is a mesh of interconnected routers. Each router has a routing table that it uses to determine to which next router it should send a packet in order for the packet to reach its destination. Each packet has a header that contains ISO/OSI Network Model Layer information. Currently, routers use Layer 3 (Network Layer) information to determine how to route packets.

Streaming media can consume tremendous amounts of network bandwidth. Thousands of people all over the world may be listening to an Internet radio program. The streaming media server transmits, at about the same time, thousands of copies of each packet. The packets may travel to their destinations over many different paths. However, thousands of copies of a packet may often travel at the same time between the same pair of routers, thereby consuming bandwidth.

SUMMARY OF THE INVENTION

The present invention provides a method of sending streaming media over a network. The method receives a packet at a router. The router determines if the received packet is addressed to multiple addressees. If not, the router inspects Layer 7 content of the received packet to determine if the received packet a stream packet. If so, and if a packet having identical Layer 7 content is in a queue for delivery to a same next router, the router adds the addressee of the received packet to the packet having identical Layer 7 content in the queue for said same next router and drops the received packet. If the received packet is addressed to multiple addressees via a same next router, the router inspects Layer 7 content of the received packet. If so, and if a packet having identical Layer 7 content is in a queue for the same next router, the router adds the addressees of the received packet to the packet having identical Layer 7 content in the queue for the same next router and drops the received packet. If the received packet is addressed to multiple addressees via multiple next routers, the router puts the received packet in respective queues for each of the multiple routers.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
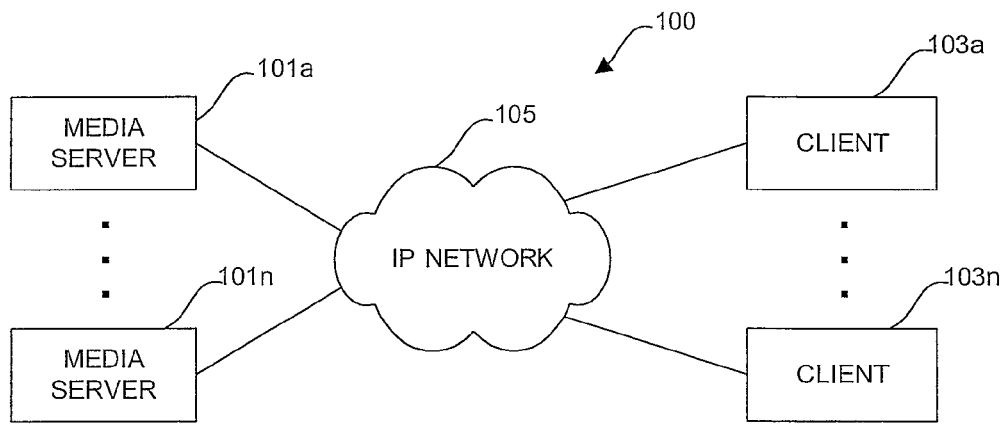
FIG. 1 is a block diagram of an embodiment of a system according to the present invention.

Referring now to the drawings, and first to FIG. 1, an embodiment of a system according to the present invention is designated generally by the numeral 100. System 100 includes media servers 101 and clients 103. As is known to those skilled in the art, media servers 101 and clients 103 are implemented in computers. System 100 includes an IP network 105 that enables selected media servers 101 and selected clients to communicate with each other. As is known to those skilled in the art, IP network 105 includes a plurality of routers (not shown in FIG. 1).

Media servers 101 are adapted to provide streaming media, such as Internet radio, to requesting clients 103. Internet radio is similar to broadcast radio in that it is provided in real time to whomever may be listening. Internet radio differs from broadcast radio in how it is transmitted to listeners. In broadcast radio, a signal is transmitted "over the air" and listeners may access the broadcast signal by tuning their radio receivers to the frequency of the transmitter. In Internet radio, a media server 101 packetizes the content stream and transmits the packets addressed to clients 103 that have requested the content. Since Internet radio is provided in real time, the server or servers 101 transmit each packet to each requesting client 103 at substantially the same time. The clients 103 assemble the packets into the content stream to which their respective users may listen.

Figure 2:
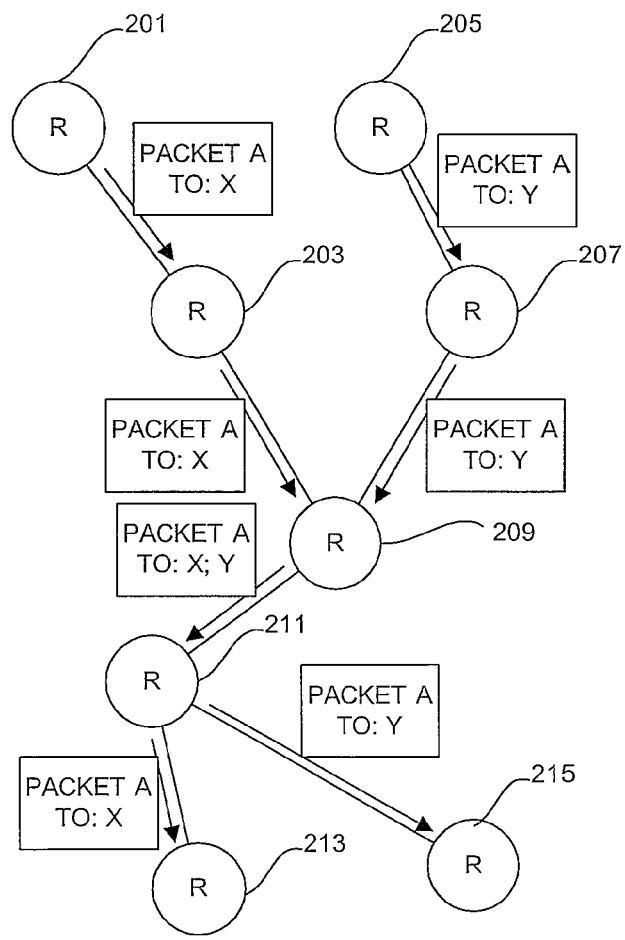
FIG. 2 illustrates an example of an embodiment of routing according to the present invention; and, FIG. 3 is a flow chart of an embodiment of router processing according to the present invention.

FIG. 2 illustrates an example of routing according to the present invention. A router 202 routes a packet A addressed to IP address X to a router 203. Substantially simultaneously, a router 205 routes the same packet A addressed to IP address X to router 207. Routers 203 and 207 each determine by inspection of ISO/OSI Network Model Layer 3 (Network Layer) and from their respective routing tables that they should each route packet A to router 209. Router 209 thus receives, at about the same time, two copies of packet A. According to the present invention, and as will be explained in detail hereinafter, routers inspect the Layer 7 (Application Layer) content of packets they receive. Inspection may be bit-by-bit, or by hashing the packet, or by other comparison methods. If a router determines that packets having identical content are to be routed to the same next router, the router addresses one of the packets to the appropriate recipients and drops the other packet. Thus, router 209 determines that both copies of packet A should be routed to next router 211. According to the present invention, router 209 sends a single copy of packet A addressed to IP addresses X and Y to router 211. Further according to the present invention, when a router receives a packet addressed to multiple IP addresses, the router determines if the packet should be forwarded to different next routers in order to reach the appropriate IP addresses. Thus, router 211 determines that packet A addressed to X should be routed to router 213 and packet A addressed to Y should be routed to router 215.

Figure 3:
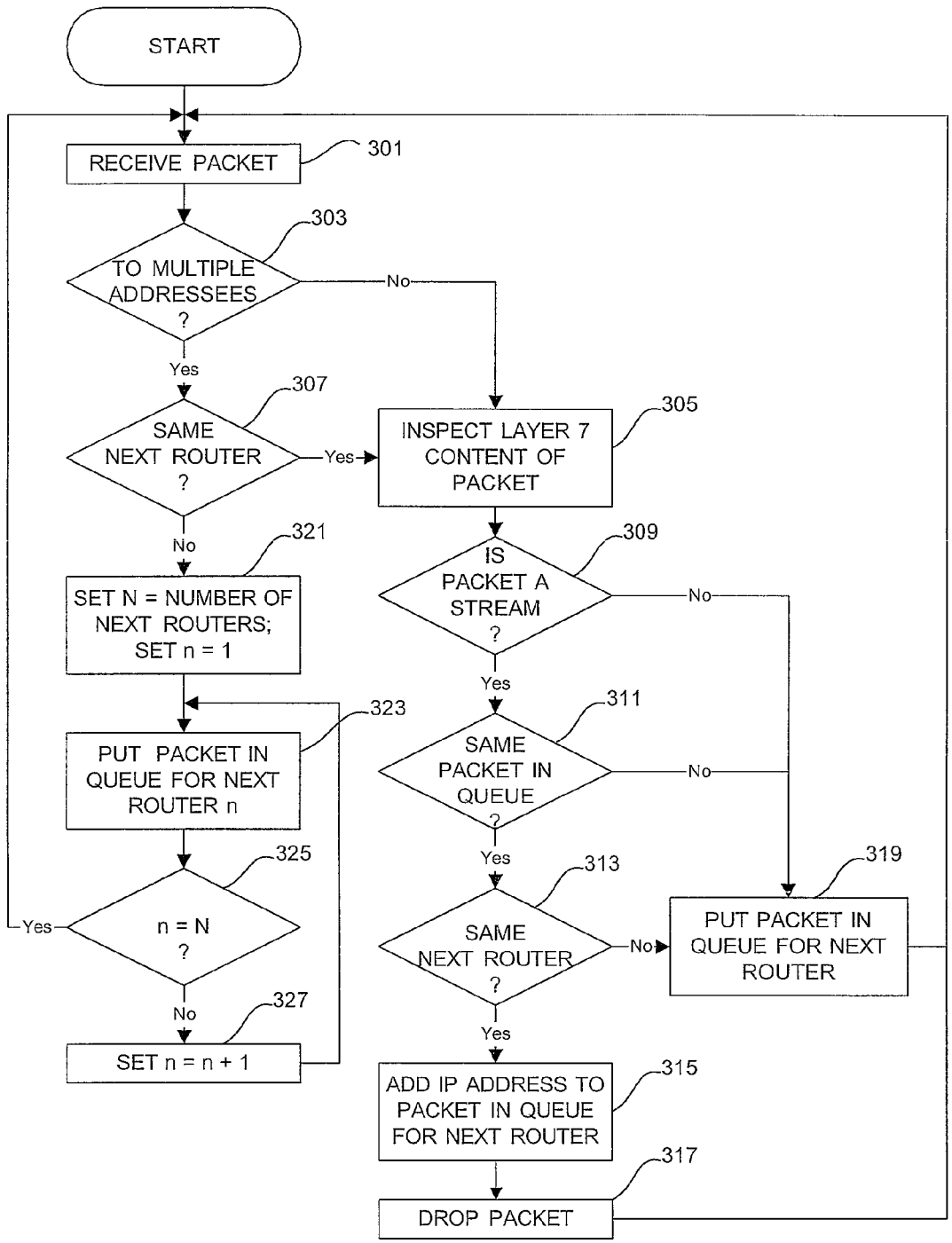

FIG. 3 is a flow chart of an embodiment of router processing according to the present invention. A router receives a packet, at block 301. The router determines, at decision block 303, if the packet is addressed to multiple addressees. If not, the router inspects the Layer 7 content of the packet, at block 305. If, as determined at decision block 303, the packet is addressed to multiple addressees, the router determines, at decision block 307 if the packet should be routed to the same next router. If so, the router inspects the Layer 7 content of the packet, at block 305. The router determines, at decision block 309, if the packet is a stream packet. If so, the router determines, at decision block 311, if a packet having the same content as the received packet is and a queue to be routed to a next router. If so, the router determines, at decision block 313, if the received packet and the queued packet should be routed to the same next router. If so, the router adds the IP address of the addressee of the received packet to the queued packet, at block 315. The router then drops the received packet, at block 317. If, as determined at decision block 309, the received packet is not a stream, or, as determined at decision block 311, the received packet is not the same as a queued packet, or, as determined at decision block 313, the received packet and queued packet should not be delivered to the same next router, the router puts of the received packet in the queue for its next router, at block 319.

Returning to decision block 307, if the router determines that the packet addressed to multiple addressees should not be routed to the same next router, the router sets N equal to the number of next routers, and n equal to one, at block 321. The router puts a copy of the packet in the queue for next router n, at block 323. Then, the router determines if n is equal to N, at decision block 325. If not, the router sets n equal to n plus one, at block 327, and processing returns to block 323. Processing loops through blocks 323-327 until n is equal to N.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of sending streaming media over a network, which comprises:
   receiving a packet at a router;
   determining if said packet is addressed to multiple addressees;
   if said packet is addressed to a single addressee, inspecting Layer 7 content of said packet;
   if said packet is a stream and if a packet having identical layer seven content is in a queue for a same next router, adding the addressee of said packet to said packet having identical Layer 7 content in said queue for said same next router and dropping said packet;
   if said packet is addressed to multiple addressees via a same next router, inspecting Layer 7 content of said packet;
   if said packet is a stream and if a packet having identical layer seven content is in a queue for said same next router, adding the addressees of said packet to said packet having identical Layer 7 content in said queue for said same next router and dropping said packet;
   if said packet is addressed to multiple addressees via multiple next routers, putting said packet in respective queues for each of said multiple routers.

* * * * *